A. D. ADRIANCE.
CULTIVATOR.
APPLICATION FILED OCT. 11, 1911.
1,053,341. Patented Feb. 18, 1913.
2 SHEETS—SHEET 1.
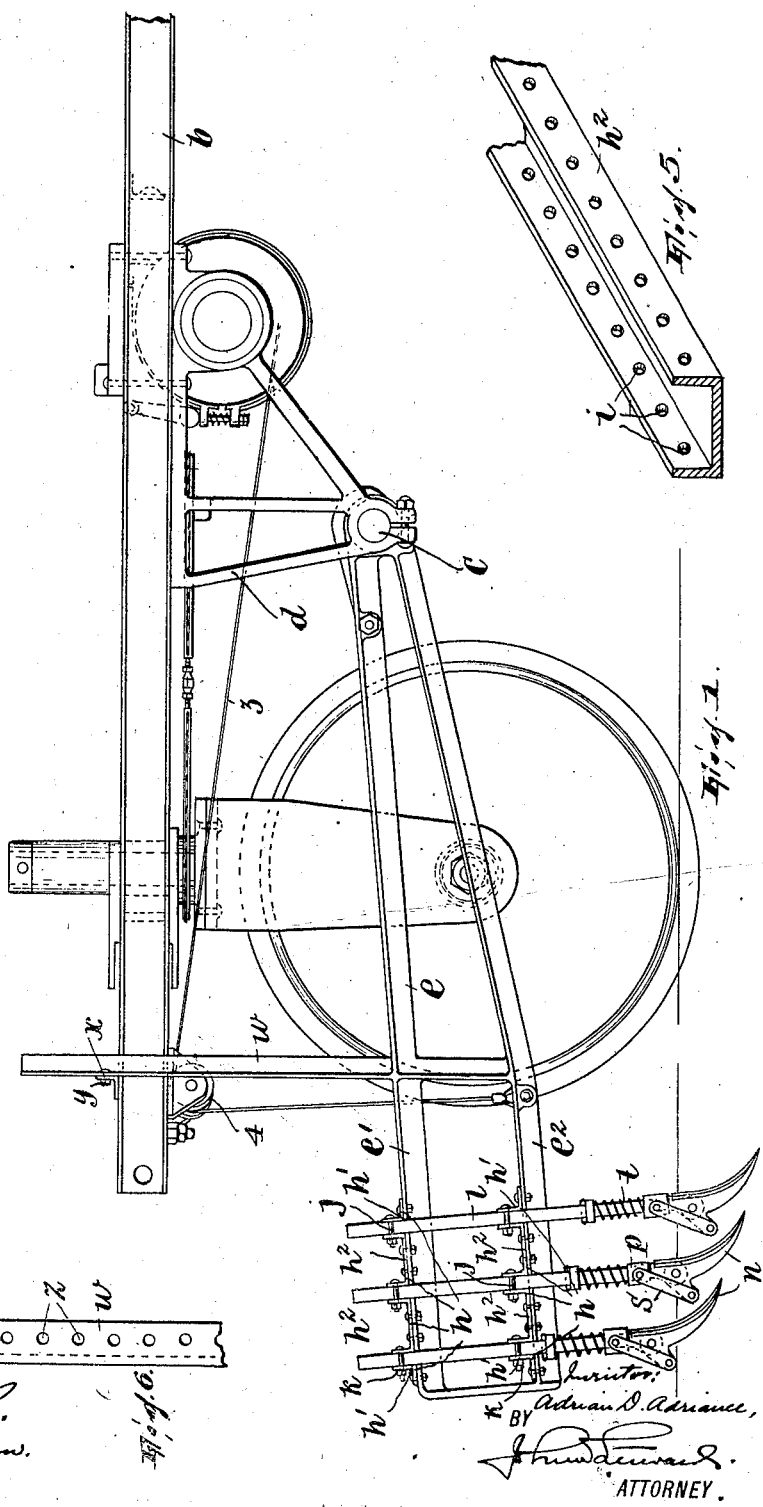

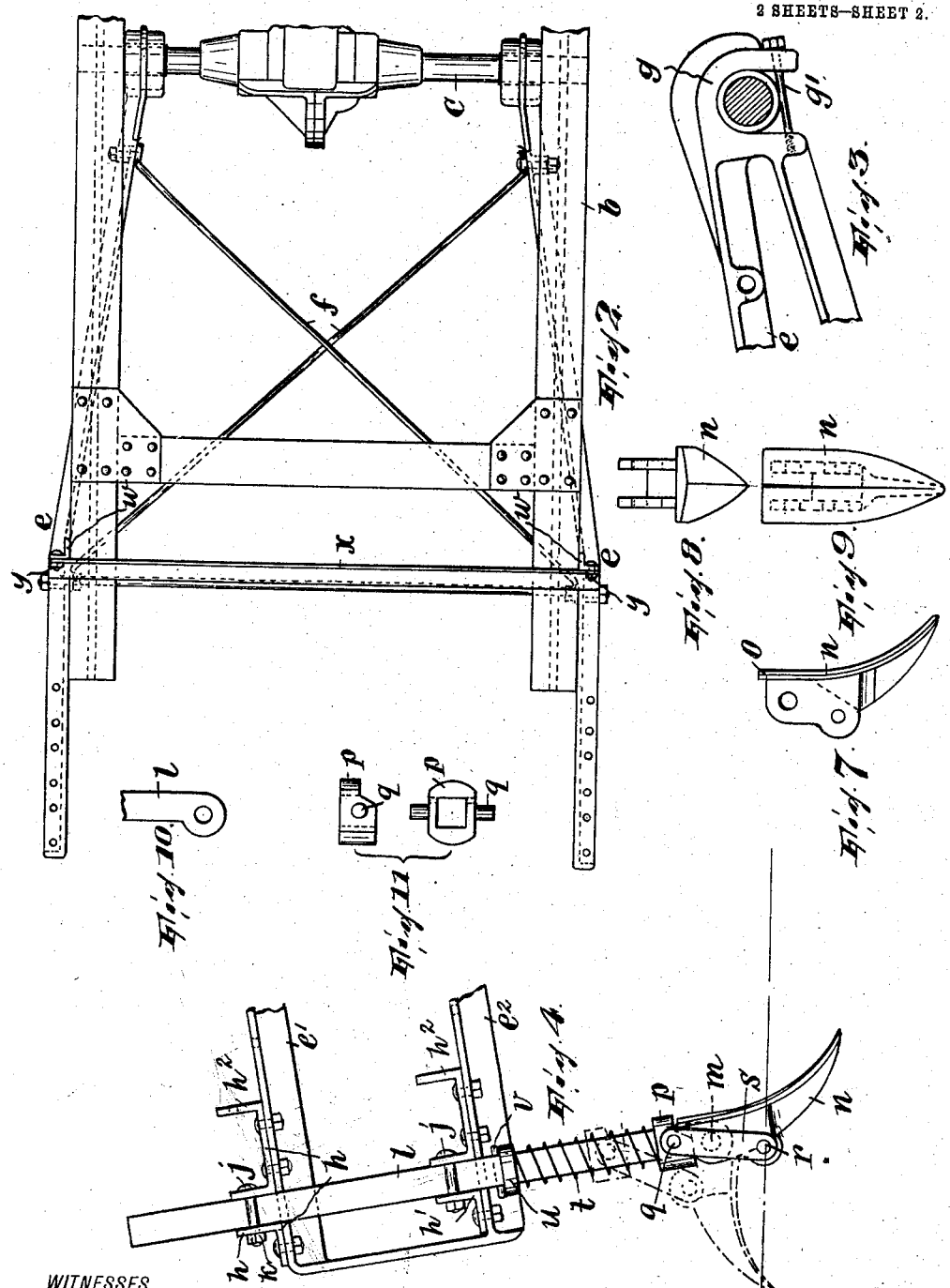

UNITED STATES PATENT OFFICE.

ADRIAN D. ADRIANCE, OF NEW YORK, N. Y.

CULTIVATOR.

1,053,341.   Specification of Letters Patent.   Patented Feb. 18, 1913.

Application filed October 11, 1911. Serial No. 654,171.

*To all whom it may concern:*

Be it known that I, ADRIAN D. ADRIANCE, a citizen of the United States, residing at New York city, in the county of New York and State of New York, have invented certain new and useful Improvements in Cultivators, of which the following is a specification.

This invention relates to cultivators, and particularly to cultivators of the class in which the shovels are arranged in two or more sets or groups.

The invention consists in certain improvements whereby adjustment of not only the groups of shovels but each unit thereof to various positions may be accomplished, so as not only to change the spacing of the groups from each other but the relative arrangement of the units of each group and their vertical disposition, thus adapting the cultivators for use under different conditions in respect to the spacing of the growing plants, the extent to which the disintegration of the soil is to be carried, etc.

The invention further consists also in a novel construction and arrangement of parts whereby the cultivator may as a whole be adapted to work at different depths.

In the accompanying drawings, Figure 1 is a side elevation of my improved cultivator attached to a traction-engine, only a part of which is shown; Fig. 2 is a plan view of the rear part of the traction-engine, showing the cultivator frame attached thereto and certain parts of said frame removed; Fig. 3 is a side elevation of the forward part of the cultivator frame; Fig. 4 is a side elevation of the rear part of the cultivator frame; Fig. 5 shows one of the parallel gripping members for the shares of the cultivator; Fig. 6 is a detail view of a fragment of the cultivator frame; Figs. 7, 8 and 9 are side, front and plan views of one of the share blades; Fig. 10 is a detail of a fragment of the shank of a share; and Fig. 11 is a view, showing in side elevation and plan a certain plunger appertaining to a share blade.

In the drawings, $b$ designates the frame of a traction engine or other suitable means whereby the cultivator is drawn over the ground to be cultivated, the rear part of which extends back of a shaft $c$ arranged horizontally in suitable hangers $d$. To this shaft the frame of the improved cultivator is pivotally attached, as will appear later herein.

$e$—$e$ designates skeleton side frames each suitably reinforced and each including an upper rail $e'$ and a lower rail $e^2$ which are parallel in their rear portions but converge forward in their forward portions as seen in side elevation. As seen in plan, the side frames as to their forward portions converge forwardly, their rear portions being preferably parallel.

$f$ designates crossed braces connecting and stiffening the cultivator frame.

The forward end of each side frame is formed as a downwardly opening bearing $g$ which is hooked over the shaft $c$, $g'$ being a retaining pin set in the bearing below the shaft to keep the cultivator frame from being unshipped from the shaft.

Connecting the rails $e'$, and either bolted or riveted thereto, is the series of parallel spaced and transverse members $h$; a similar series of members $h$ is either bolted or riveted to the lower rails $e^2$, each member thereof being directly below the corresponding member in the upper series of members $h$. In the preferred construction the outermost members $h'$ in each series are strips of angle iron, disposed with their vertical sides adjacent to each other, while the intermediate members $h^2$ are channel irons. The adjacent vertical parts of each two adjacent members are formed from end to end with series of coinciding holes $i$ (Fig. 5) through which bolts $j$ having nuts $k$ are passed, the function of the bolts being to draw the vertical portions of said members together so that they will grip the shanks of the shares and securely hold the same when they are fitted between them.

Now describing one of the shares: $l$ is a straight metallic shank having a rectangular cross-section whose dimensions are such that it will snugly fit between any two adjacent members $h$ and the bolts $j$. On a pivot $m$ at the lower end of this shank is fulcrumed a blade $n$ having appreciable rearward pivotal movement but being limited against forward pivotal movement past the position shown in Fig. 4, where a stop $o$ on the blade engages the end of the shank. Slidably arranged on the shank $l$ is a plunger $p$ having trunnions $q$, and connecting these trunnions with trunnions $r$ on the blade at a point below its pivot in Fig. 5 are the links $s$.

The plunger is normally held depressed by a spiral spring $t$ coiled about the shank and interposed between said plunger and a collar $u$ impinging against a pin $v$ penetrating the shank. The spring is of sufficient power so as normally to resist the tendency of the blade to swing backward on its pivot; but should some obstruction be met, the blade will yield backwardly until the obstruction is passed. The construction serves to prevent the breaking or damaging of the blade upon meeting with obstructions which will not yield thereto.

As already intimated each share is secured in position by introducing its shank between corresponding pairs of members $h$ of the two series (upper and lower) and then tightening the bolts so that the said members firmly grip said shanks. It will be observed that not only is each share individually adjustable vertically, by this construction, but that each is also adjustable laterally to a variety of positions between its gripping members, making it not only possible to change the relation of the shares of each group but also the disposition of the groups with relation to each other, according to the character of the work which is to be done by the cultivator. The bolts being arranged one on each side of and close to the shank of each share the shanks are thereby positively held against working sidewise out of position.

Each side frame $e$ includes a standard $w$, the two standards being connected by a cross-piece $x$ in the form of a strip of angle iron bolted thereto, which extends across and rests upon the rear part of the frame $b$ of the traction-engine. The bolts $y$ which secure the cross-piece $x$ to the standards may be fitted to any of the vertical series of holes $z$ in the standards. Thus, according to the position to which the cross-piece is adjusted, the cultivator as a whole stands more or less elevated with relation to the ground, so that its shares work at greater or less depth therein. The standards bear laterally against relatively opposite sides of the frame $b$ and thus confine the cultivator frame against undue lateral movement.

The cultivator may be raised or lowered as occasion requires from a hoisting mechanism 2 of any suitable construction (that shown being the subject of another copending application filed by me) through the medium of the flexible connections 3 extending around the pulleys 4 and attached to the cultivator frame.

Having thus fully described my invention, what I claim as new and desire to secure by Letters Patent is:—

1. The combination of the longitudinally extending side frames, elongated members secured flatwise upon and extending transversely of the side frames in spaced disposition and having upstanding flanges extending longitudinally thereof and disposed at the adjoining sides of said members, shares having shanks received between said flanges, said flanges having plane adjoining faces, and means, comprising devices arranged one on each side of and close to each shank, for drawing the flanges of said members into gripping relation to each shank, substantially as described.

2. In combination with a support, a cultivator frame pivoted on a horizontal axis at its forward part to the support and having share members in its rear part, a part of the support overhanging the cultivator frame, said cultivator frame having standards, and a cross-piece rigidly attached to and vertically adjustable on the standards and resting on the overhanging part of the support, substantially as described.

3. In combination, with a support, a cultivator frame pivoted on a horizontal axis at its forward part to the support and having share members in its rear part, a part of the support overhanging the cultivator frame, said cultivator frame having standards, and a cross-piece rigidly attached to the standards and resting on the overhanging part of the support, said standards being disposed close to relatively opposite sides of said overhanging part of the support, substantially as described.

In testimony whereof I affix my signature in presence of two witnesses.

ADRIAN D. ADRIANCE.

Witnesses:
JOHN W. STEWARD,
WM. D. BELL.